United States Patent [19]

Paquet et al.

[11] Patent Number: 5,704,199
[45] Date of Patent: Jan. 6, 1998

[54] METHOD FOR MOVING A SHEARBAR IN A FORAGE HARVESTER

[75] Inventors: Bert Juul Frans Paquet, Sint-Andries; Dirk Cyriel André Ameye, Zedelgem, both of Belgium

[73] Assignee: New Holland North America, Inc., New Holland, Pa.

[21] Appl. No.: 625,448

[22] Filed: Mar. 28, 1996

[30] Foreign Application Priority Data

Mar. 31, 1995 [GB] United Kingdom ............... 9506717

[51] Int. Cl.⁶ .................................................. A01D 34/62
[52] U.S. Cl. ..................... 56/10.2 B; 56/249; 56/294; 56/DIG. 2; 56/DIG. 15
[58] Field of Search ..................... 56/10.2 B, 249, 56/294, 7, 249.5, 251, 252, DIG. 15, DIG. 2

[56] References Cited

U.S. PATENT DOCUMENTS 5,018,342  5/1991  McClure et al. ................. 56/10.5
5,083,976  1/1992  McClure et al. ................. 56/10.2 R X

FOREIGN PATENT DOCUMENTS

0291216A1  11/1988  United Kingdom.

Primary Examiner—Terry Lee Melius
Assistant Examiner—Heather Shackelford
Attorney, Agent, or Firm—Larry W. Miller; John W. Stader; Frank A. Seemar

[57] ABSTRACT

A method for moving a shearbar (102) towards a fixed stop (109), wherein the method comprises the steps of: energizing a bidirectional motor (110/112) for driving a guide screw (106/108) to move the shearbar towards the fixed stop (109), monitoring a variable indicative of the torque or force output of the motor (110/112), limiting the torque or force output to a first maximum value, moving the shearbar (102) against the fixed stop (109) and stalling the motor (110/112) thereby, deenergizing the motor (110/112), when the resulting torque or force output reaches or exceeds the first maximum value; and energizing the motor (110/112) for moving the shearbar (102) in the opposite direction, away from the stop (109), while not limiting the torque or force output or while limiting the same to a second maximum value, which is substantially larger than the first maximum value. This method can be used in an automatic shearbar adjusting routine, wherein it is not required to rely on limit switches for precluding stalling of the motors (110/112) when the shearbar (102), engages the stop (109).

10 Claims, 10 Drawing Sheets

METHOD FOR MOVING A SHEARBAR IN A FORAGE HARVESTER

FIELD OF INVENTION

The present invention relates generally to forage harvesters and more particularly to a method for automatically moving a shearbar which is installed next to a rotatable cutterhead, the ends of the shearbar being movable in a confined space at the sides of the cutterhead frame of a forage harvester.

BACKGROUND OF THE INVENTION

In European Patent Application EP-A-0.291.216 there is disclosed a method for adjusting a shearbar towards a rotating cutterhead. The outer ends of this shearbar extend through an openings in the cutterhead frame and can be shifted on a support bar by means of lead screws driven by bidirectional motors. These motors are equipped with inner and outer limit switches for precluding stalling of the motors when one end or other of the shearbar engages a border of the opening during its forward or rearward movement. If such contact would take place, the stalling motor would apply such tightening force on the lead screw, that the same motor would not be able to reverse the screw for moving the shearbar in the opposite direction. These limit switches are monitored throughout the shearbar adjustment program described in European Patent Application EP-A-0.291.216 and constitute a critical factor in the control of the motors.

Malfunctioning of one or more of these switches, which may be caused by internal failure or by damaged leads and connections, will render further automatic sharpening impossible. However, because of their use in a very harsh environment, there are substantial risks that such failures occur during otherwise normal harvesting operations.

The proper operation of the adjustment program further requires a correct setting of the switches. Improper setting may interrupt the adjustment program without clear and obvious reason to the operator. When he wants to remedy the situation he may have to interfere with complicated gear systems and notches having a critical setting, such that he has to call for help from a well informed person.

Even when installed properly, the limit switches restrict the operative length over which the shearbar can be moved in comparison to the full length of the opening. When the diameter of the cutterhead has been ground to the extent that the shearbar reaches its inner limit without obtaining a proper setting of the shearbar to the cutterhead knives, the normal harvesting operations have to be interrupted for repositioning the cutterhead knives to a larger diameter. As the limit switches must stop the movement of the shearbar before it has contacted the frame, there remains a substantial gap which is still available for further adjustment, such that the delay caused by the repositioning of the knives could be postponed.

SUMMARY OF THE INVENTION

It therefore is an object of the present invention to remedy the problems mentioned above and to provide an automatic shearbar adjusting method in which there is no further need for switches which restrict the path of travel of the shearbar, while the method still can be used with the motors and guide screws of the prior art.

According to the invention a method is provided for moving a member of an agricultural machine towards and away from a fixed stop in the machine, the method comprising the steps of; energizing a bidirectional motor for driving a screw to move the member towards the stop, monitoring a variable indicative of the torque or force output of the motor, and limiting the torque or force output to a first maximum value, the method characterized by the further steps of; moving the member against the fixed stop and stalling the motor thereby, deenergizing the motor, when the resulting torque or force output reaches or exceeds the first maximum value, and energizing the motor for moving the member in the opposite direction, away from the stop, while not limiting the torque or force output or while limiting the same to a second maximum value, which is substantially larger than the first maximum value.

When this member is moved further away from the stop, the motor output may be limited again to the first maximum value. The motor may be constituted by a bidirectional electrical motors and one may choose to monitor the electrical current consumed thereby. The motor output may be limited by providing a limited amount of electrical power thereto or by deenergizing the motor when the consumed electrical current reaches or exceeds a preset value.

This method may be used advantageously in an automatic routine for adjusting a shearbar to a cutterhead in a forage harvester.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
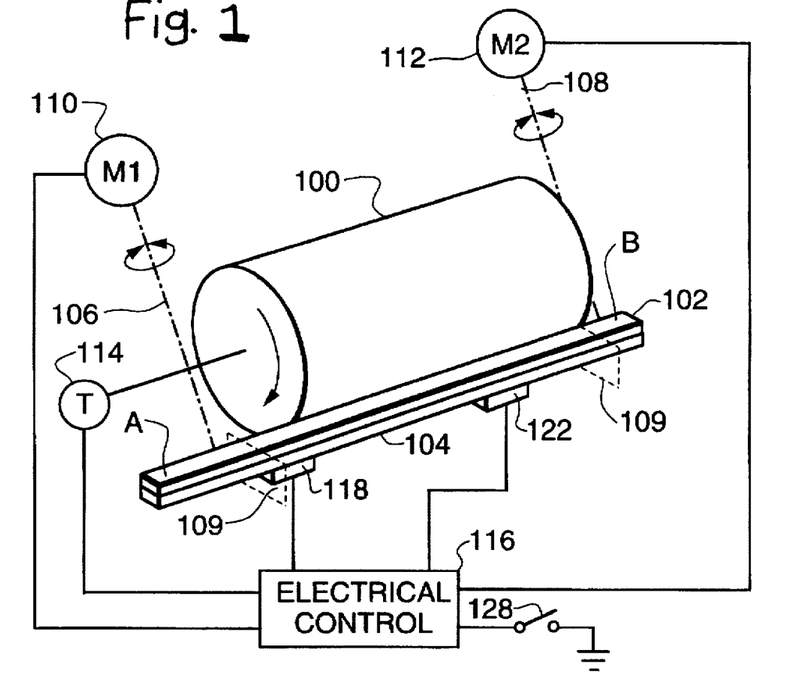
FIG. 1 schematically illustrates an automatic control system for the adjustment of a shearbar relative to a rotating cutterhead.

FIG. 1 schematically illustrates a cutting apparatus comprising a rotating cutterhead 100 and an adjustable but affixed shearbar 102. By way of example only, the cutting apparatus may be the cutterhead and shearbar of a forage harvester as illustrated European Patent Application EP-A-0.287.159. The shearbar 102 is mounted on a support bar 104 but is movable with respect to the support bar by actuation of linkages such as a pair of lead screws 106, 108. The outer ends of the shearbar 102 extend through apertures 109 in the side walls 111 of a cutterhead body. The rear portion of the aperture 109 constitutes a fixed stop for the inward movement of the shearbar 102 to the cutterhead 100. The front portion thereof may constitute a fixed stop for the outward movement of the shearbar 102, but the latter may equally be halted by another fixed component of the cutting apparatus, such as a feedroll scraper, attached to the support 104.

The cutterhead 100 carries a plurality of knives which, as the cutterhead rotates, cooperate with the shearbar 102 to cut material passing between the cutterhead and the shearbar.

A first bidirectional motor 110 drives lead screw 106 which is linked to a first end A of the shearbar. A second bidirectional motor 112 drives lead screw 108 which is linked to a second end B of the shearbar.

Adjustment of the shearbar 102 relative to the cutterhead 100 is accomplished with the cutterhead rotating. A tachometer 114 senses rotation of the cutterhead shaft and produces a sequence of pulses indicating the cutterhead speed which is applied to an electrical control circuit 116. Adjustment is accomplished by sensing vibrations, or the absence of vibrations in the support bar 104 resulting from contact, or the lack of contact, between the shearbar 102 and the knives of the rotating cutterhead 100. A vibration or knock sensor 118, which may comprise a crystal, is attached to the support bar 104. The support bar has an internally threaded hole 120 (FIG. 3) for receiving a threaded mounting stud provided on the crystal mount.

Figure 3:
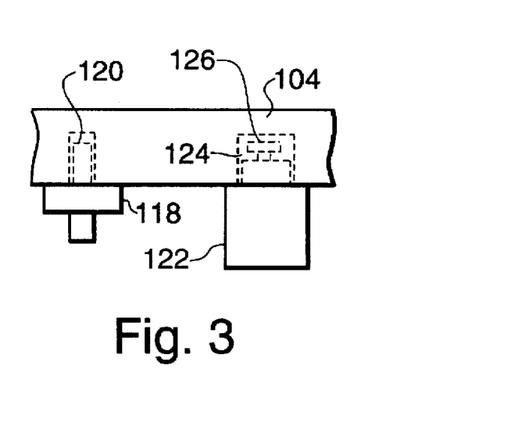
FIG. 3 illustrates the mounting of an impact element and a vibration sensor on a shearbar support.

Since adjustment is accomplished by sensing vibrations resulting from contact between the shearbar 102 and the knives of the cutterhead 100, it is essential that shearbar adjustment not be attempted if the sensor 118 is not functioning. A solenoid-actuated knocker 122 is provided for determining the operability of the knock sensor. The knocker 122 has a threaded mounting stud which secures the knocker to an internally threaded hole 124 in the support bar 104. The solenoid has a spring-biased armature which carries an impact element 126 at its end. When the solenoid is energized it drives the impact element 126 into contact with the support bar 104, inducing vibrations in the support bar which are sensed by the sensor 118. The electrical control 116 pulses the knocker 122 and analyses the signals returned by the sensor 118.

A push-button switch 128 is provided on a control panel near the operator. Each time the operator actuates switch 128, the electrical control circuit 116 checks the operability of sensor 118 as well as its sensitivity, checks to determine that the cutterhead 100 is rotating and selectively energizes first one of the motors 110, 112 and then the other until the cutter bar 102 is essentially parallel to the cutterhead 100 and spaced therefrom by no more than a small predetermined distance on the order of one to two tenths of a mm.

Figure 4A:
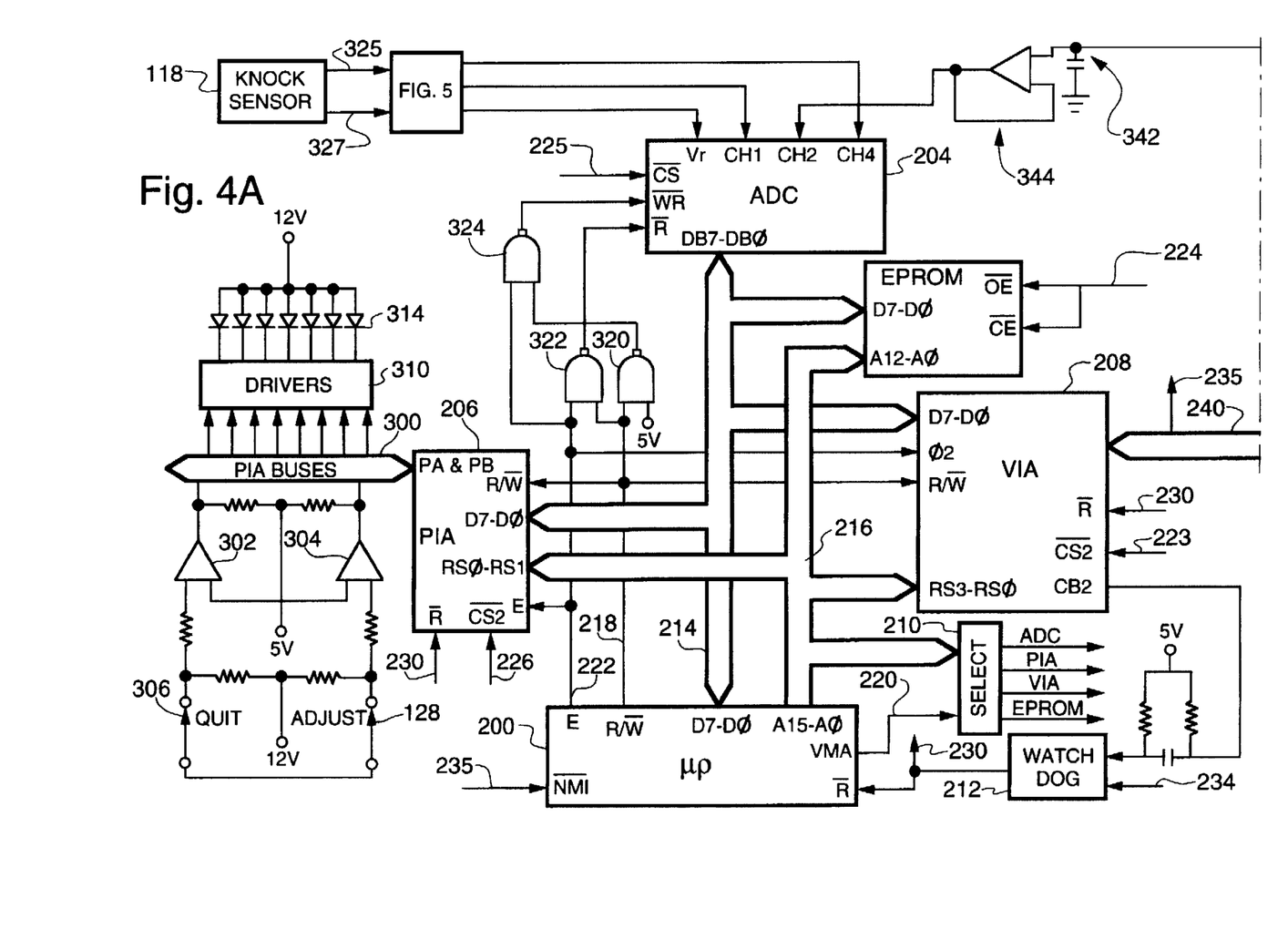
FIGS. 4A and 4B, when arranged as shown in FIG. 4C, comprise a circuit diagram of the electrical controls for controlling the shearbar adjustment and the testing and sensitivity adjustment of the vibration sensor.
Figure 4B:
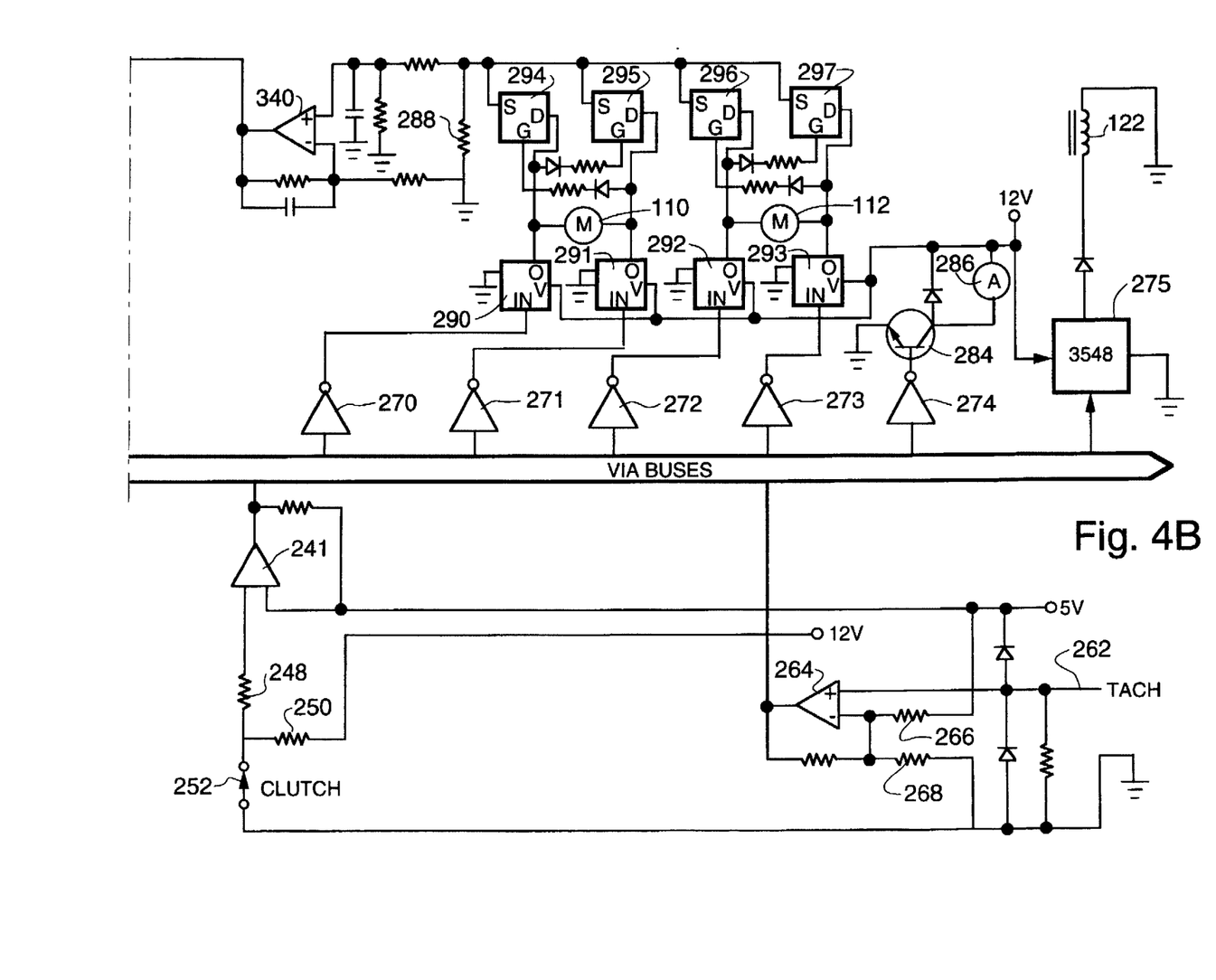
Figure 4C:
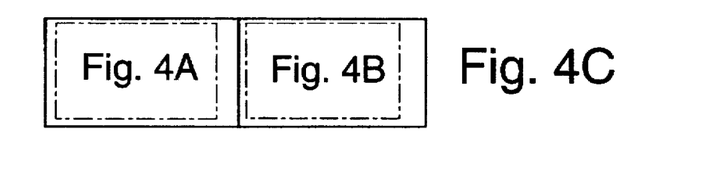

The electrical control circuits 116 are illustrated in FIGS. 4A and 4B and include a microprocessor 200, an EPROM 202, an analog-to-digital converter (ADC) 204, a peripheral interface adapter (PIA) 206, a versatile interface adapter (VIA) 208, an address decoder or selector 210 and a watch dog circuit 212. All units except the watch dog circuit are interconnected by an 8-bit bidirectional data bus 214 and/or a 16-bit address bus 216.

Since the details of the VIA 208, microprocessor 200, EPROM 202, ADC 204, PIA 206, and address decoder 210 are well known in the art, they are not described in detail herein but a brief description of each is given below.

The microprocessor 200 may be a Motorola type 6802 microprocessor including an internal memory for limited storage of data during a processing operation. The microprocessor has eight input/output terminals D7-D0 which are connected to the data bus 214 and sixteen output terminals A15-A0 for supplying an address generated within the microprocessor to the address bus 216. When a data register within the microprocessor is loaded with a byte of data for application to the data bus the microprocessor drives the signal R/$\overline{W}$ on lead 218 to logic 0 and when the data register is to receive a byte of data from the data bus the microprocessor causes the signal R/$\overline{W}$ to go to logic 1. When the microprocessor places an address on the address bus it generates the signal Valid Memory Address (VMA) on lead 220 and this signal is applied to the gating input of address decoder 210. The microprocessor outputs a single phase clock onto lead 222 from its E terminal.

Microprocessor 200 has a non-maskable interrupt (NMI) input terminal. A low-going signal at this terminal causes the microprocessor 200 to initiate a non-maskable interrupt sequence. The microprocessor 200 also has a reset input terminal $\overline{R}$ and when the signal on lead 230 goes to low the registers within the microprocessors are cleared and the microprocessor becomes inactive. When the signal at terminal $\overline{R}$ goes high it causes the microprocessor 200 to begin a restart sequence.

Address bus bits A15-A13 are connected to input terminals of the address decoder 210. Each time the microprocessor outputs a signal on lead 220, it enables the address decoder to decode the three address bits and produce a signal on one of the leads 223–226. The lead 223 is connected to the $\overline{CS2}$ input of VIA 208. Lead 224 is connected to the $\overline{OE}$ and $\overline{CE}$ inputs of EPROM 202. Lead 225 is connected to the $\overline{CS}$ input of ADC 204 while lead 226 is connected to the $\overline{CS2}$ input of PIA 206.

The EPROM 202 may be a type 2764 capable of storing 8K 8-bit bytes. When the signal on lead 224 is low the location in the EPROM specified by the address applied to the EPROM from bus 216 is accessed. The location is either written to from the microprocessor, or read out to the microprocessor, depending upon whether the signal R/$\overline{W}$ is low or high, respectively. EPROM 202 stores data and the program which is executed by the microprocessor.

The VIA 208 may be a type 6522 such as that manufactured by Rockwell or Synertek. As disclosed at page 2526–2530 of the publication IC Master 1980, published by United Technical Publications, the VIA 208 includes 16 addressable registers and interval timers or counters. These registers and interval timers are addressed by applying an address from the four low order of bits of the address bus 216 to the register select input RS3-RS0. Data is read from, or entered into the registers and counters through data terminals D7-D0 which are connected to the data bus 214. The VIA is enabled only when the microprocessor outputs a hexadecimal address, the high order bits of which cause the address decoder 210 to produce a low signal on lead 223 which enables the chip select ($\overline{CS2}$) input of the VIA. The register or counter which is accessed is determined by the four low order bits of the address bus which are applied to register select inputs RS3-RS0 of the VIA. The accessed register or counter is either read from or written into depending upon whether the microprocessor 200 outputs a high or low level signal, respectively, on lead 218 to R/$\overline{W}$ terminal of the VIA. The 02 input of the VIA is a clocking input and is used to trigger data transfers. It is connected by lead 222 to the E terminal of the microprocessor 200. All circuits within VIA 208 are reset when the signal $\overline{RES}$ on lead 230 goes low. The VIA 208 produces an output signal CB2 which is used for control purposes. The microprocessor program periodically sends a byte of control information to VIA 208 to toggle CB2 and pulse watch dog circuit 212. The watch dog circuit may be two monostable multivibrators connected in series. Periodic pulses produced on lead 232 by the VIA periodically reset the watch dog circuit so that its output remains inactive. If the program should fail to send signals to the VIA 208 so that lead 232 is pulsed, the watch dog circuit times out and emits an output signal to reset the microprocessor, the VIA and the PIA 206. The watch dog circuit 212 also has an input 234 which is derived from a monitoring circuit (not shown) which monitors the logic circuit supply voltage. If this voltage should vary outside predetermined limits the signal on lead 234 cause the watch dog circuit 212 to produce an output signal to reset the microprocessor, the PIA and the VIA. The 5 V supply voltage for the circuits of FIGS. 4A and 4B may be derived from the 12 V battery which supplies power for the harvester if it is self-propelled, or from the battery for the tractor which pulls the harvester.

VIA 208 has two 8-bit input/output ports PA and PB. The bit positions of the ports are individually programmable as either an input or an output. Two buses, collectively designated 231, connect PA and PB to external circuits shown in FIG. 4B. The port A bus is connected to receive the output of an amplifier 241, which has one input connected to the 5 V logic supply voltage and a second input connected through two resistors 248 and 250 to the 12 V power supply. The junction between resistors 248 and 250 is connected through a switch 252 to ground. As long as switch 252 is closed the amplifier applies a logic 0 signal to the bus but when switch 252 is open the amplifier applies a logic 1 signal to the bus. The switch 252 is associated with an engage lever (not shown) which is actuated so that a chain drive causes the cutterhead 100 to rotate. Switch 252 is thus closed when drive power is applied to the cutterhead 100.

The tachometer 114 (FIG. 1) produces a sequence of output pulses at a rate proportional to the speed of rotation of the cutterhead 100. The pulses are applied over a lead 262 (FIG. 4B) to one input of a comparator amplifier 264. A voltage divider comprising two resistors 266 and 268 is connected between 5 V and ground, and a reference voltage is applied from the junction of the resistors to a second input of amplifier 264. When the tachometer produces an output pulse exceeding the magnitude of the reference voltage, amplifier 264 applies a logic 1 signal to bit position 6 of the B bus. These pulses are counted by a counter (timer 2) in VIA 208.

Five bits of port B of the VIA are connected by a B bus to five inverters 270-274. The outputs of the inverters 270-273 are connected to the input pins of Mosfets 290-293, respectively. The V pins of the Mosfets 290-293 are connected to the 12 V source. The output of inverter 274 is connected to the base of a grounded emitter transistor 284 and the collector thereof is connected to the 12 V source through an audible alarm 286.

The Mosfets 290-293 may be of type BTS 432, manufactured by Siemens. As disclosed at pages 7-125 to 135 of the publication Smart SIPMOS Data book 93/94, published by Siemens AG, the Mosfets 290-291 have five pins, whereof only the ground pin, the input pin IN, the voltage source pin V and the output pin O are shown in FIG. 4B. The status output pin ST is not reproduced in this diagram. When the voltage at the input pin IN exceeds a threshold voltage, current is permitted to flow from the voltage source to the output pin O for providing power to a load.

Each output pin of the Mosfets 290, 291, 292 and 293 is connected via a diode and a resistor to the gate pin G of Mosfets 295, 294, 297 and 296 respectively. The latter may be of type BTS 140A, as manufactured by Siemens. As disclosed at pages 6–153 to 161 of said publication Smart SIPMOS Data book 93/94, the Mosfets 294–295 have three pins, including said gate pin G, a drain pin D and a source pin S. When the voltage at the gate pin G exceeds a threshold voltage, current is permitted to flow from the drain pin D to the source pin S. The drain pins D of Mosfets 294–297 are connected to the output pins O of Mosfets 290–293 respectively. The source pins S are connected through a current sensing resistor 288 to ground.

Figure 2:
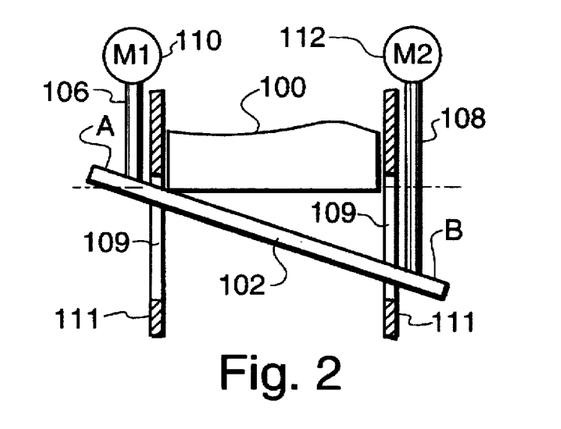
FIG. 2 is a diagram useful in explaining the method of adjusting the shearbar.

The two leads of motor 110 are linked to the output pins O of the Mosfets 290 and 291. The sense of rotation of motor 110 is controlled via the input signal at pins IN of the Mosfets 290 and 291, whereof only one may be set at any given time. When a logic 1 is applied to pin IN of Mosfet 290, the motor rotates in one sense to move end A (FIG. 2) of the shearbar 102 inwardly toward the cutterhead 100. The current flow path extends from 12 V through pins V and O of Mosfet 290, motor 110, pins D and S of Mosfet 295 and current sensing resistor 288 to ground. On the other hand, if a logic 1 is applied to pin IN of Mosfet 291, a circuit extends from the 12 V source through pins V and O of Mosfet 291, motor 110, pins D and S of Mosfet 294 and current sensing resistor 288 to ground. Since the current flows in the opposite direction through the motor 110, it rotates in the opposite sense to move end A of the shearbar 102 away from the cutterhead 100. If none of the pins IN of Mosfets 290 and 291 is energized, motor 110 does not rotate because no current can be supplied through said Mosfets.

The current flowing to the motor 110 can be restricted by applying a block-wave signal to the input pin IN of one of the Mosfets 290, 291. Pulse Width Modulation (PWM) techniques can be used in this circuit for varying the amount of current and hence the amount of power delivered to the motor 110. The microprocessor 200 can steer the VIA 208 to generate at its output ports a block-wave signal of any pulse width and rate for input to the inverters 270–273 and therefrom to the Mosfets 290–293 respectively.

The two leads of motor 112 are linked to the output pins 0 of the Mosfets 292 and 293, which control the motor 112 in exactly the same manner as the manner in which the motor 110 is controlled by the Mosfets 290 and 291.

Bit 7 of port B of VIA 208 is controlled by one of the timers in VIA 208. The timer (TIC) causes an interrupt pulse to appear at PB7 each time the counter is loaded, the delay between the loading of the counter and the occurrence of the pulses being determined by the value entered into the counter. PB7 is connected by a lead 235 to the $\overline{\text{NMI}}$ input of microprocessor 200 so that the program being executed by the microprocessor is interrupted periodically and a routine is executed to read the various switches and output various control signals to the VIA and PIA buses.

One bit of the PB bus is connected to a type 3548 PNP drive circuit 275. The output of the driver circuit 275 is connected to ground through the solenoid of knocker 122. As subsequently explained, the solenoid is energized to induce vibrations in the shearbar 104 and the resulting vibrations sensed by sensor 118 are analyzed to determine its operability.

The PIA 206 may be a type 6821 peripheral interface adapter. This device is well known in the art and is generally similar to VIA 208 except that it does not include timers. PIA 206 has two 8-bit ports PA and PB connected to an A bus and a B bus, collectively illustrated as buses 300. The bit positions of the ports are individually programmable for input or output. Only two bit positions of port A are utilized and they are programmed as inputs. These bit positions receive the outputs of the two amplifiers 302 and 304. A QUIT switch 306 is connected between ground and one input of amplifier 302 so that when the switch is closed the amplifier applies a logic 1 signal to the PIA over the bus. Switch 306 is actuated to halt or interrupt a shearbar adjusting operation.

The switch 128 is connected to one input of amplifier 304 and when this switch is actuated the amplifier applies a logic 1 signal to the PIA over the bus. Switch 128 is the ADJUST switch which initiates a shearbar adjusting sequence.

Only seven bits of port B of PIA 206 are utilized and they are all programmed as outputs. Each bit is connected through a driver 310 and an LED 314 to 12 V. The LEDs provide an operator with visual alarms or indications of the status of the system by indicating that: the system is ready to begin an adjusting cycle; switch 306 has been actuated to interrupt an adjusting cycle; a motor 110 or 112 has stalled; the cutterhead 100 is not rotating; an end of travel has been reached; the sensor 118 is bad; or a shearbar adjusting operation is in progress.

ADC 204 may be a type 0844 converter such as that described at page 3537 of the publication IC Master, Vol. 2, 1984. The converter has four multiplexed input channels but only CH1, CH2 and CH4 are utilized in the present invention. The converter is enabled only when the address applied to selector 210 by microprocessor 200 causes the signal on lead 225 to be low. This lead is connected to the CS terminal of the converter 204.

The microprocessor 200 starts a converter cycle by placing a command on data bus 214 to select the channel, and driving lead 218 low. Lead 218 is connected to one input of two NANDs 320 and 322. The second input of NAND 320 is connected to +5 V and the output of the NAND is connected to a further NAND 324. The E output of microprocessor 200 is connected to one input of NANDs 322 and 324 and the outputs of these NANDs are connected to the $\overline{R}$ and $\overline{WR}$ inputs, respectively, of the converter. When the signal on lead 218 is low, NAND 324 produces a low output when the clocking signal on lead 222 goes high. The output of NAND 324 enables the converter so that the operation specified by the command is carried out.

It takes the converter about 40 microseconds to convert an analog value to a digital value. The programming of microprocessor 200 is such that once it initiates a cycle of converter 204 it either waits or performs other operations until at least 40 microseconds have elapsed. The microprocessor 200 then places an address on bus 216 so that selector 210 produces a signal on lead 225 to select the converter. At the same time, the microprocessor 200 drives the signal on lead 218 high. When the clock signal on lead 222 goes high NAND 322 produces an output signal which enables the converter to place the converted value on bus 214 from whence it passes to the microprocessor 200.

The analog signal from vibration or knock sensor 118 is applied to the CH1 input of the A/D converter through a circuit (FIG. 5) including resistors 328 and 329, amplifiers 330 and 332, a peak hold circuit 334 and a buffer amplifier 336. A pair of resistors 331, 333 provide a first reference voltage which is added to the knock sensor output signal, the output of amplifier 330 being proportional to the sum of the reference signal and the differential signal derived from the sensor. A second reference voltage is derived from a voltage divider comprising resistors 337 and 339. The second reference voltage is applied to an amplifier 340 and the output of the amplifier is tied to a junction 338 between the peak hold circuit 334 and buffer amplifier 336.

Figure 5:
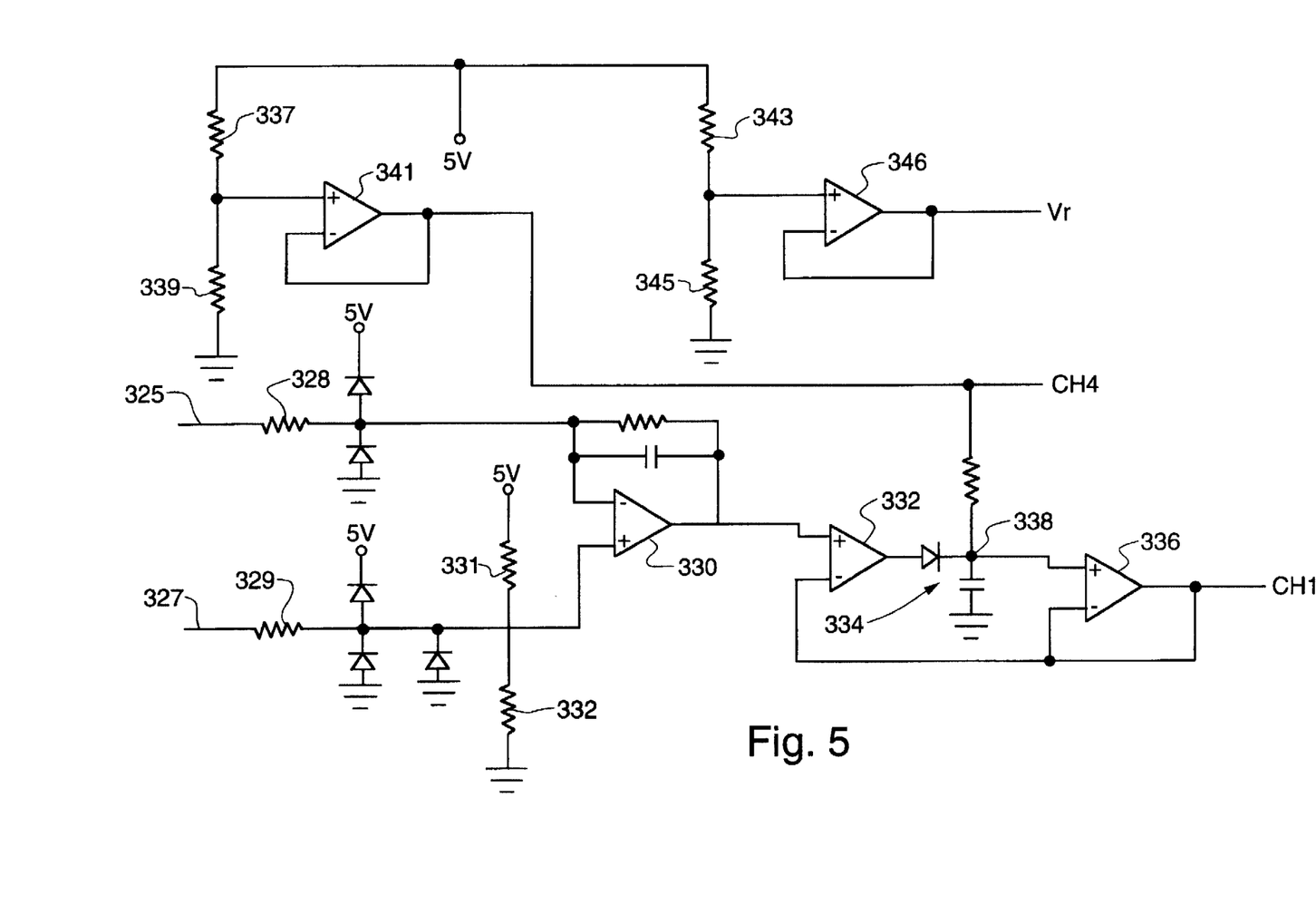
FIG. 5 shows the vibration sensor output circuits and the circuits for applying reference signals to the analog-to-digital converter.

The output of amplifier 341 is also applied to the CH4 input of ADC 204. The ADC 204 is controlled to operate in a differential mode so that it determines the difference in the magnitude of the analog signals at CH1 and CH4 and converts this difference to a digital value for transmission to the microprocessor 200.

Resistors 343 and 345 form a voltage divider which is tapped to provide an input to an amplifier 346. The output of this amplifier is applied to the $V_r$ input of ADC 204 to set the range of the converter.

During a shearbar adjusting operation motors 110 and 112 (FIG. 4B) control the movement of the shearbar 102. As previously explained, the circuit for energizing either motor 110, 112 in either sense extends through current sensing resistor 288. Thus, by sampling the voltage across the resistor 288 it is possible to establish the actual current consumed by either of the motors 110, 112. One may therefrom if either motor is stalled or if the motor which should be running is not actually energized. The voltage developed across resistor 288 is applied through an operational amplifier 340, filter circuit 342, and buffer amplifier 344 to the CH2 input of ADC 204 where it may be sampled. The ADC does not subtract the magnitude of the CH4 signal from the CH2 before doing an ADC.

INITIALIZE Routine

When power is turned on the microprocessor 200 automatically goes through an initialization routine (FIG. 6) during which the various registers and timers in the VIA and PIA are set up. This routine also clears the switch registers or locations in memory 202 which store indications of the last sampled state of the various switches. The routine then clears the QUIT, PULSW and RPMOK Flags and sets a FIRST Flag. In addition, flags are set to turn off the alarm and alarm lights as well as the sensor light. The stack in the microprocessor 200 is initialized after which the program proceeds to the first step of the READY routine.

READY and NMIR Routines

Figures 6, 7, 8:
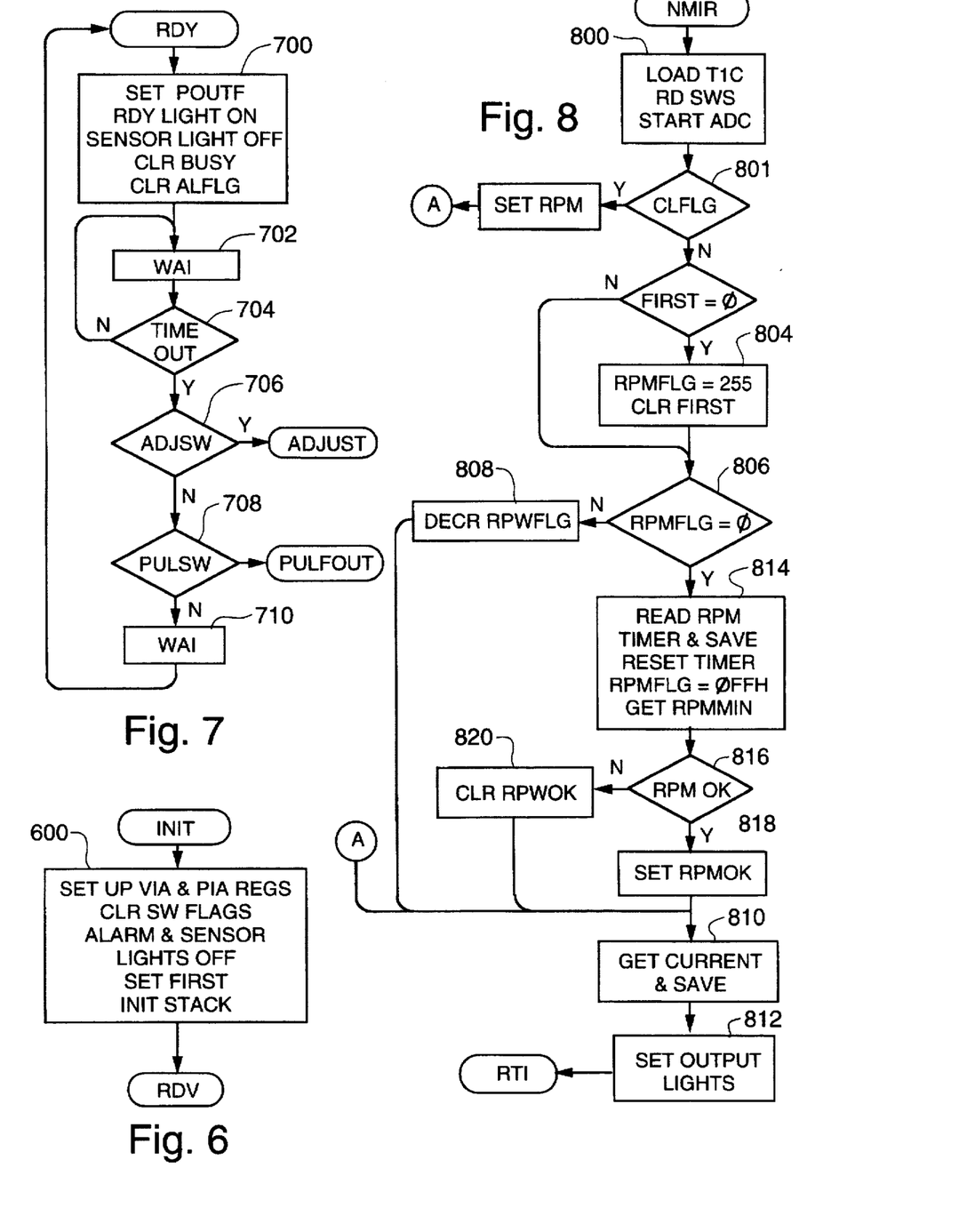
FIG. 6 shows the INITIALIZE routine.
FIG. 7 shows the READY routine.
FIG. 8 shows the NMIR routine.

The READY routine is illustrated in FIG. 7. It begins at step 700 by setting the flag POUTF. The Ready Light Flag is set so that the ready light may be turned on when the NMIR routine is next executed. The Sensor Light Flag is cleared so that the sensor light will be turned off the next time VIA 208 pulses the watchdog circuit 212. The BUSY and ALFLG flags are cleared after which the program proceeds to step 702 where it executes a Wait for Interrupt instruction. At about 2.5 ms intervals a pulse occurs at PB7 of the VIA 208 thereby pulsing the $\overline{NMI}$ input to microprocessor 200. The microprocessor interrupts the routine it is executing, in this case the READY routine, and executes the NMIR routine illustrated in FIG. 8.

At step 800, the NMIR routine loads the counter T1C in VIA 208. This counter is decremented and when it reaches zero it will again pulse PB7 of the VIA to initiate another NMIR routine. The PIA next senses the QUIT and ADJUST switches and sets flags indicating which switches are actuated. In addition, if both switches are actuated a flag PULSW is set. The microprocessor then addresses the ADC 204 to initiate a read-convert cycle with CH2 as the selected input. This samples the motor current and converts it to a digital value.

At step 801 the CLFLG flag is tested to see if the clutch in the cutterhead drive chain has been engaged to actuate clutch switch 252. If it has not, a flag is set to turn on one of the indicator lights 314 to indicate that the RPM of the cutterhead 100 is not within limits, and the program branches to step 812 to turn on the indicator. A return is then made to the routine which was interrupted.

If CLFLG indicates that the clutch is engaged, the program proceeds to step 802 where the FIRST flag is tested. This flag was set during the INIT routine so the program proceeds from step 802 to step 804 where FIRST is cleared and a value is set into RPMFLG. This value will be counted down to time the interval during which tachometer pulses produced by the cutterhead tachometer 114 will be counted by timer 2 in VIA 208.

At step 806 RPMLFG is tested to see if the timing interval has elapsed. Assuming it has not, the program decrements RPMFLG at step 808 and at step 810 the converted value of the current flowing through the shearbar adjusting motors is read from ADC 204 and saved. At step 812 the program sends data to PIA 206 to turn on the appropriate indicator lights. The program then returns to the routine which is interrupted to execute the instruction following the last instruction executed before the interrupt.

In FIG. 7, steps 702 and 704 comprise a loop which is repeatedly executed until the test at step 704 indicates that a preset interval of time has elapsed. The program then tests the ADJSW flag at step 706 and the PULSW flag at step 708. Assuming that the ADJUST switch is not actuated either alone or concurrently with the QUIT switch, the program executes another Wait for Interrupt at step 710 and then loops back to step 700. Thus, assuming the ADJUST switch is not actuated the READY routine is repeatedly executed, the routine being interrupted every 2.5 ms to execute the NMIR routine. Because FIRST is cleared at step 804 during the first execution of the NMIR routine after the cutterhead clutch is engaged, the program branches from step 802 to 806 on the second and subsequent executions of the routine. RMPFLG is decremented at step 808 each time the NMIR routine is executed and after 255 ms RPMFLG is reduced to zero. The test at step 806 proves true and the program moves to step 814 where the count of tachometer pulses accumulated by timer 2 in VIA 208 is read and saved, and RPMFLG is reloaded to time another 255 ms interval.

RPMMIN is a value representing the minimum permissible rate of rotation of the cutterhead 100. At step 816 RPMMIN is compared with count of tachometer pulses. If the count is equal to or greater than RPMMIN the RPMOK flag is set at step 818. If the count is less then RPMMIN then RPMOK is cleared at step 820. After step 818 or 820 the ADC 204 is addressed to again get the converted value of the adjusting motor current.

PULOUT Subroutine

Figure 9:
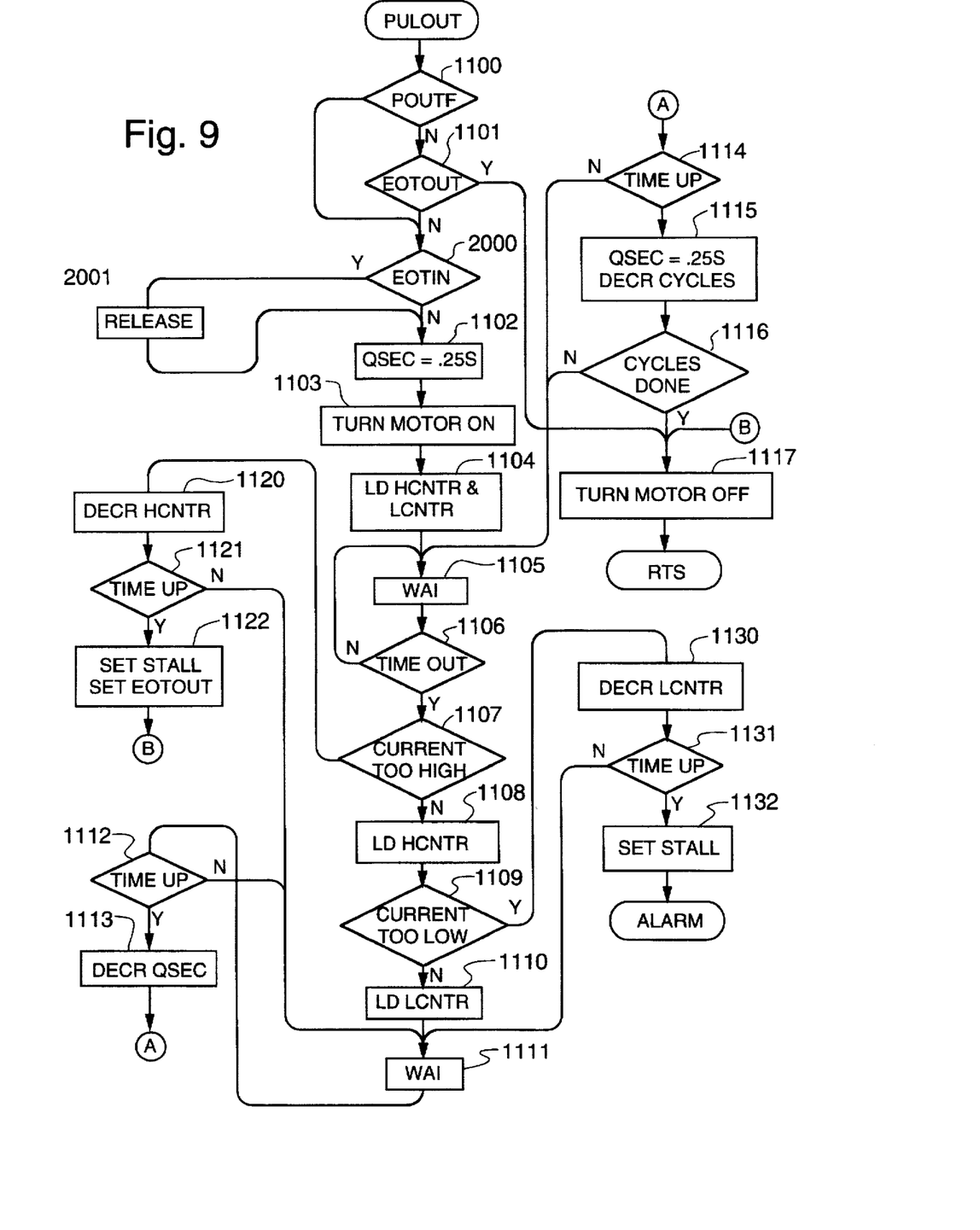
FIG. 9 shows the PULOUT routine.

The PULOUT subroutine shown in FIG. 9 is called for the purpose of moving one end A or B of the shearbar 102 out, i.e. away, from the cutterhead 100 by a given amount. At the time the subroutine is called the microprocessor A register holds an indication of which motor 110 or 112 is selected to be energized and in what sense, and the X register holds a value CYCLES indicating how many ¼-second intervals the motor is to be energized.

The subroutine begins at step 1100 by checking POUTF. If this flag is set the program branches to step 2000 at which the status of the EOTIN (End Of Travel INward) flag corresponding to the selected motor is checked. As described further with respect to the ADJUST routine, this flag is set when the motor has pulled the corresponding end A, B of the shearbar 102 against its inward stop. If the test at step 2000 proves true, the program branches to step 2001 at which a subroutine RELEASE is loaded for moving said shearbar end away from it (inward) stop. This subroutine is described further with reference to FIG. 10. After successful completion of this subroutine, the program branches back to step 1102.

In case EOTIN is not set at step 2000, the program jumps directly to step 1102, where QSEC is loaded with a value indicating ¼-second. QSEC is decremented at step 1113 each time the loop comprising steps 1105–1116 is executed, and reaches zero after ¼ second.

At step 1103 the microprocessor sends the motor indication to the output register of VIA 208 controlling port B. A PWM signal with a 60% duty cycle (PW=0.6) is produced on the B bus to actuate one of the Mosfet pairs 291, 294 or 293, 296 so that one of the motors 110 or 112 is energized to begin moving one end A, B of the shearbar 102 away from the cutterhead 100.

At step 1104 two counter locations HCNTR and LCNTR are loaded with values for timing high current and low current intervals. The motor current is checked as subsequently described to see if it exceeds a predetermined maximum value (e.g. the motor is stalled) or is less than a predetermined minimum value, (e.g. motor winding circuit is open). If it exceeds the maximum value for an interval of time corresponding to the count set in HCNTR, the EOTOUT (End Of Travel OUTward) flag corresponding to the selected motor, is set and an alarm condition (STALL) is indicated at step 1122. If the motor current is less than the minimum value for an interval of time, corresponding to the count set in LCNTR, the subroutine is terminated and an alarm condition (STALL) is indicated.

At steps 1105 and 1106 the program executes a loop waiting for the motor circuit transients to die out. Each interrupt occurring during execution of the loop causes the NMIR routine to be executed and during its execution the motor current is sensed, converted to a digital value and saved, as explained with reference to FIG. 8. At step 1107 the saved current value is compared with a reference value to see if the current is too high. Assuming the motor current is not too high, HCNTR is reloaded at step 1108 to restart the high current timing interval.

At step 1109 the current value is compared to a minimum reference value to see if it is too low. Assuming it is not, LCNTR is reloaded at step 1110 to restart the low current timing interval. Steps 1111 and 1112 merely waste time so that the loop comprising steps 1105–1114 takes 0.01 second. At step 1113 QSEC is decremented and at step 1114 it is tested to see if it has reached zero. Assuming it has not, the program branches back to step 1105 and repeats the loop.

After ¼ second the test at step 1114 proves true so the program moves to step 1115 where QSEC is reloaded to time another ¼ second interval, and CYCLES is decremented. CYCLES is then tested at step 1116 to see if the required number of ¼ second intervals have elapsed. If not, the program branches back to step 1105. If the required number of ¼ second intervals has elapsed then the required movement of the motor is complete. At step 1117 the microprocessor sends a value to the output register of VIA 208 which turns off any motor that is on. A return is then made to the calling routine.

If the test at step 1100 shows that POUTF is not set then the program tests the EOTOUT flag at step 1101 to see if either of the shearbar ends is pushed against an outward stop. In case either end is blocked the program branches to step 1117, turns the motor off, and returns to the calling routine.

If the test at step 1107 shows that the motor current is too high, the program branches to step 1120 where HCNTR is decremented. HCNTR is then tested at 1121 to see if the high current condition has existed for too long a time. If it has not, the program moves to step 1111 and proceeds as described above. If the high current condition persists for too long a time, HCNTR will be decremented to zero and the test at step 1121 will prove true. In this case EOTOUT and STALL flags are set, the latter being used to turn on a stall indicator 314 and sound the alarm 286, after which the program jumps to the alarm routine.

Steps 1130-1132 serve the same purpose as steps 1120-1122, except that they time the interval the motor current is below the required minimum and do not set an EOTOUT flag.

RELEASE Routine

Figure 10:
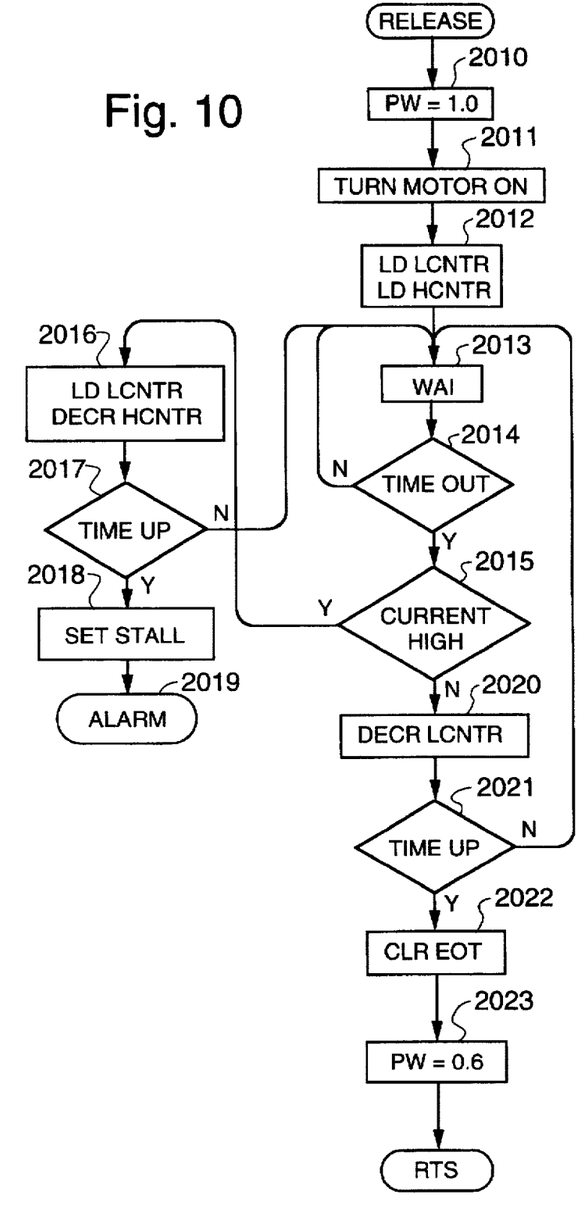
FIG. 10 shows the RELEASE routine.

The RELEASE Routine provides full power to a selected motor which was stalled because an end A, B of the shearbar 102 was pushed or pulled against a fixed outward or inward stop, for reversing the motor and releasing the blocked shearbar end from the stop. At the time the subroutine is called the microprocessor A register holds an indication of which motor 110 or 112 is selected to be energized and in what sense.

At step 2010 a variable PW which is used in setting the duty cycle of the PWM signal to the Mosfets 290-293, is loaded with the value 1.0 for a continuous high voltage at the IN pins thereof. At step 2011 full current is supplied to the selected motor which is loaded against the clamping force of the blocked shearbar 102 and the lead screw 106 or 108. At step 2012 two counter locations HCNTR and LCNTR are loaded with values for timing high current and low current intervals.

At steps 2013 and 2014 the program executes a waiting loop. Each interrupt occurring during execution of the loop causes the NMIR routine to be executed and during its execution the motor current is sensed, converted to a digital value and saved, as explained with reference to FIG. 8. At step 2015 the saved current value is compared with a reference value to see if the current is too high, which is indicative of the end A, B of the shearbar 102 not being completely released yet. If this test proves true the program reloads counter location LCNTR with its initial value of step 2012 and decrements the value at location HCNTR. When the time interval for sensing high current is not expired yet, the program branches from step 2017 back to step 2013 for another current sensing loop. When the current is still too high at the expiration of this interval, the program jumps to steps 2018 and 2019, where a STALL flag is set and an alarm is sounded to indicate that the circuitry was not able to release the shearbar end.

When the motor current has fallen below said reference value, the program proceeds from step 2015 to step 2020 at which the value at location LCNTR is decremented. When the time interval for sensing low current is not expired yet the program jumps back to step 2013 for a new evaluation of the actual motor current. After expiration of the low current interval, i.e. when the motor 110 or 112 was able to move the shearbar 102 freely during a short predetermined period, the test at step 2021 proves true and the End Of Travel flag (EOTIN or EOTOUT) corresponding to the initial stall condition, is reset at step 2022. The variable PW is reloaded with 0.6, being its default value, at step 2023. The program then branches back to the calling program.

Under normal conditions the full power delivered to the motor 110, 112 is capable is overcoming the friction forces at the connection of a lead screw 106, 108, which was stalled under restricted power, such that the motor 110, 112 will start rotating well before any alarm is sounded. For a short while the motor 110, 112 is rotated further at full power, whereafter it returns to its default operating condition, in which restricted power is delivered thereto.

ADJUST Routine

Figure 11A:
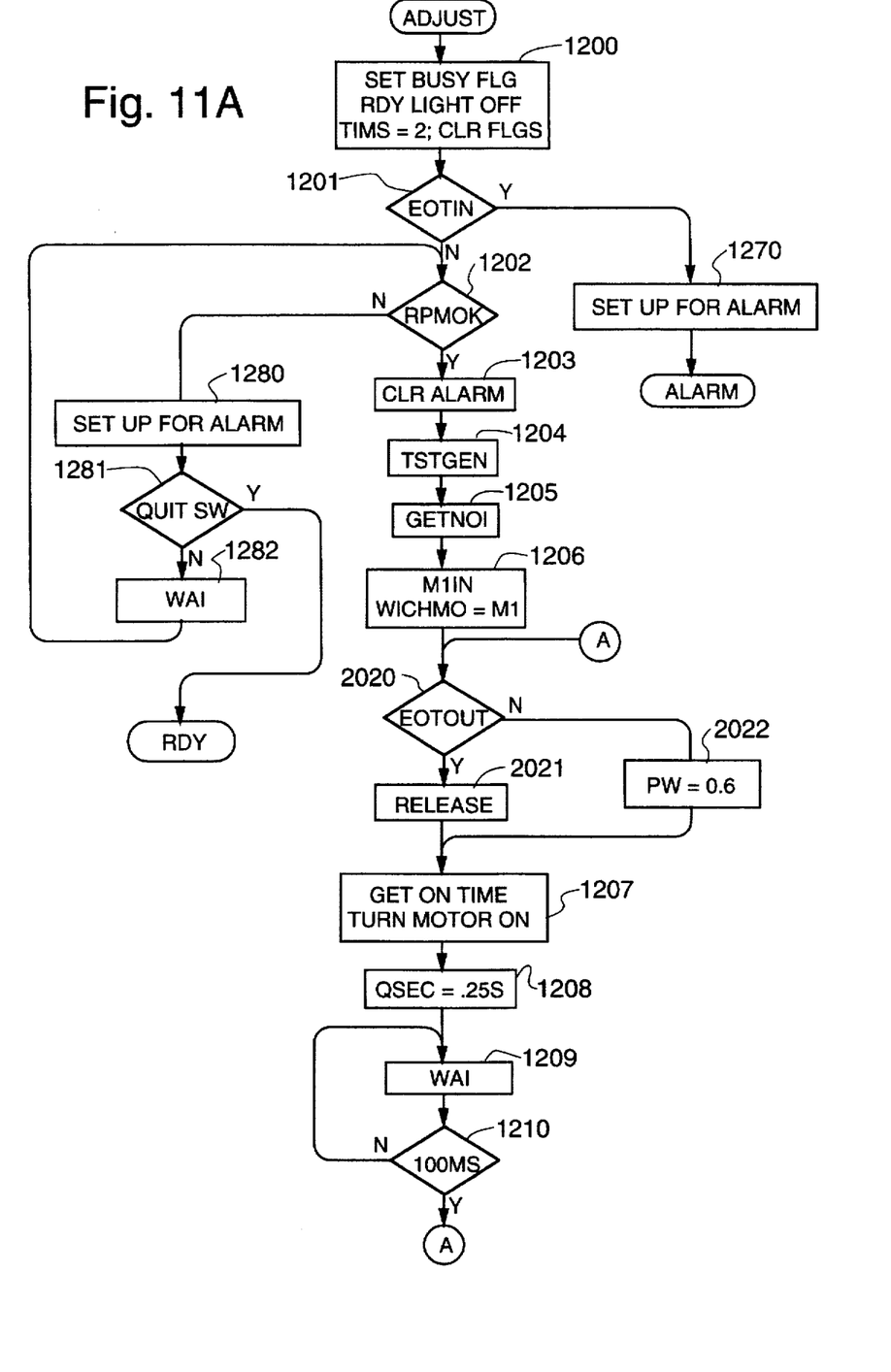
FIGS. 11A–11D show the ADJUST routine.
Figure 11B:
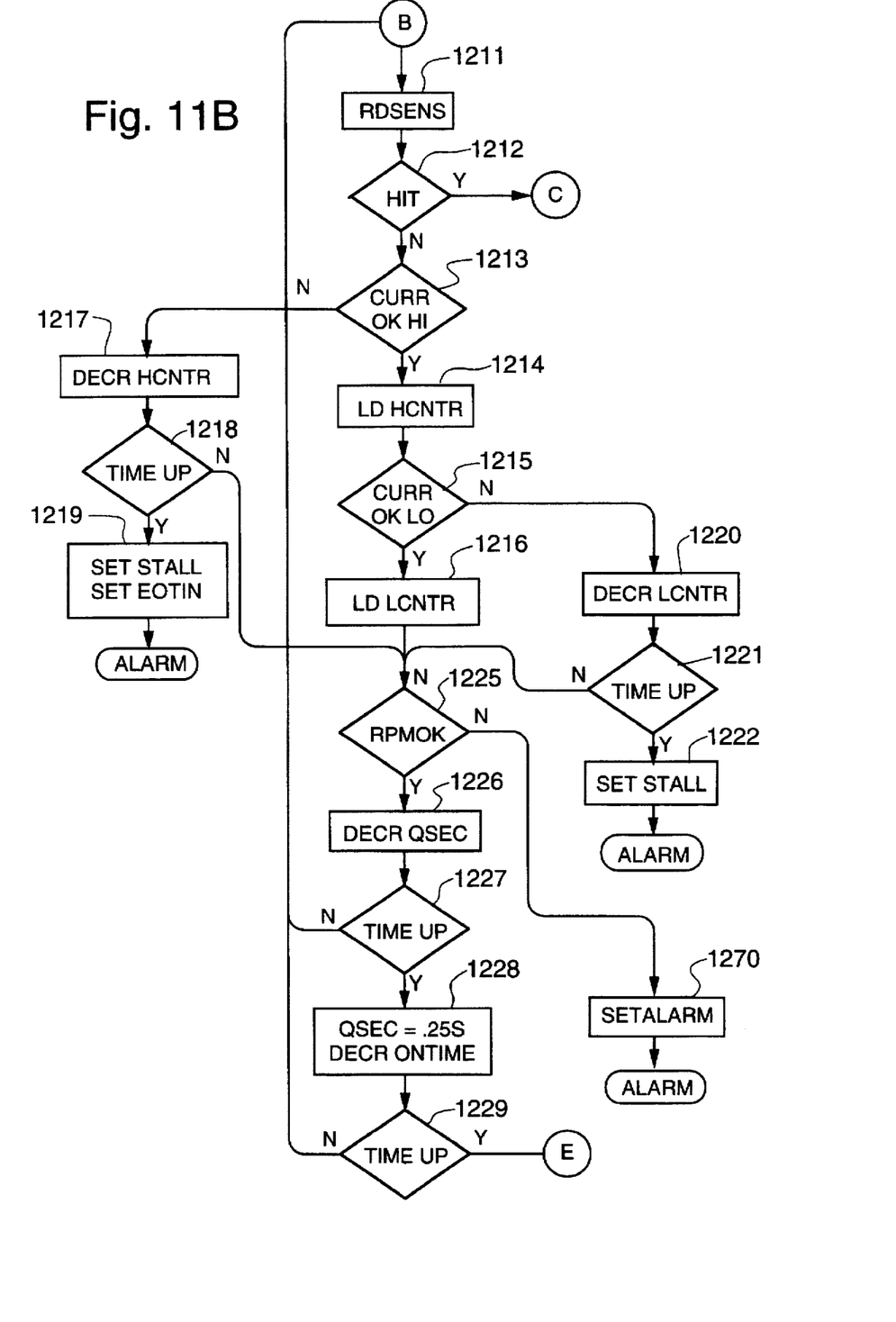

The ADJUST routine controls the motors M1 and M2 to adjust the shearbar 102 relative to the cutterhead 100. The program jumps to the ADJUST routine from step 706 of the READY routine if the ADJUST switch 308 has been actuated. The ADJUST routine begins at step 1200 where the BUSY flag is set and the READY LIGHT flag is reset so that indicators 314 will properly indicate the status of the system. The location TIMS is set to 2. If energizations of the motors 110 and 112 result in impacts between the rotating cutterhead 100 and the shearbar 102 TIMS is decremented and when TIMS=0 the adjustment is complete. Certain flags such as IMP1, IMP2 and HITFLG are cleared at step 1200.

At step 1201 EOTIN is tested to see if one end A, B of the shearbar 102 is at its limit of travel toward the cutterhead 100. If neither end is stalled, step 1202 checks the RPMOK flag to be sure that the cutterhead 100 is rotating faster than a predetermined minimum speed. Assuming that the RPM is satisfactory the program clears the flag for setting the RPM fault indicator 314.

The program jumps at step 1204 to a TSTGEN subroutine for testing the vibration sensor 118 and its output circuitry, as described in further detail in EP-A-0.291.216, Col. 12, line 51 to Col. 14, line 6. Upon the return from this subroutine the program jumps to the GETNOI subroutine to determine the background noise. This subroutine is described in further detail in EP-A-0.291.216, Col. 14, line 9 to Col. 16, line 4.

At step 1206 the microprocessor fetches M1IN and sets WICHMO to indicate that motor M1 is active. At step 2020 the program checks the status of the corresponding EOTOUT flag to see whether this motor was stalled in the outward direction. If this flag is set, the program jumps to subroutine RELEASE for full energizing of the active motor. When the screw has been released as described above, the program branches back to step 1207. If the EOTOUT flag is low, the value 0.6 is loaded into the PW variable for providing restricted power to the motor at step 2022. The program then obtains ONTIME, the number of ¼ second intervals the motor M1 is to be energized. M1IN is then sent to VIA 208 and the VIA produces a PWM output signal with a 60% duty cycle over its bus to energize Mosfets 290, 295 thereby energizing motor M1 in a sense which moves end A (FIG. 2) of the shearbar 102 toward the cutterhead 100.

Step 1208 sets QSEC to time ¼ second. Steps 1209 and 1210 introduce a 100 ms delay to allow electrical transients resulting from the motor energization to die down after which a jump is made to the RDSENS subroutine to sample the output of the knock sensor and convert it to a digital value. At step 1212, this value is compared with the value of NOI2 obtained during execution of GETNOI at step 1205. If the knock sensor output value is greater than NOI2 it indicates that the cutterhead 100 is hitting the shearbar 102 so that program branches to FIG. 11C.

Assuming that the sensor output value is less than NOI2, no hit has occurred so the program proceeds from step 1212 to step 1213 where the motor current value obtained during the last execution of the NMIR routine is compared to a value representing the maximum allowable current. If the motor current does not exceed the maximum allowable value then at step 1215 it is compared with a value representing the minimum allowable current. It may be noted that steps 1213–1222 of the ADJUST routine correspond exactly with steps 1107–1113, 1120–1122 and 1130–1132 of the PULOUT subroutine described above, except that an excessive current during a long interval sets an EOTIN flag instead of an EOTOUT flag.

If the checks of the motor current show that it is within the prescribed limits, the RPMOK flag is checked at step 1225 to see if the cutterhead 100 is still rotating. Assuming it is, QSEC is decremented at 1226 and then tested at 1227 to see if ¼ second has elapsed.

If the test at step 1227 shows that ¼ second has not elapsed then the program loops back to step 1211 and repeats the loop comprising steps 1211–1216 and 1225–1227. When ¼ second has elapsed, the test at step 1227 proves true and the program moves to step 1228 where it resets QSEC to time another quarter-second interval and decrements ONTIME, the number of quarter second intervals that the motor is to be on. In a typical system ONTIME may be about 10 such intervals.

After ONTIME is decremented it is tested at step 1229 to see if the motor energizing interval has expired. If it has not, the program loops back to step 1211. If the energizing interval has expired the program moves to step 1262 (FIG. 11C) where the flags IMP1, IMP2 and HITFLAG are cleared. The program then proceeds to step 1230 (FIG. 11D) where the microprocessor sends a code to VIA 208 which terminates the output signal to Mosfets 290, 295, such that motor M1 stops.

Figures 11C, 11D:
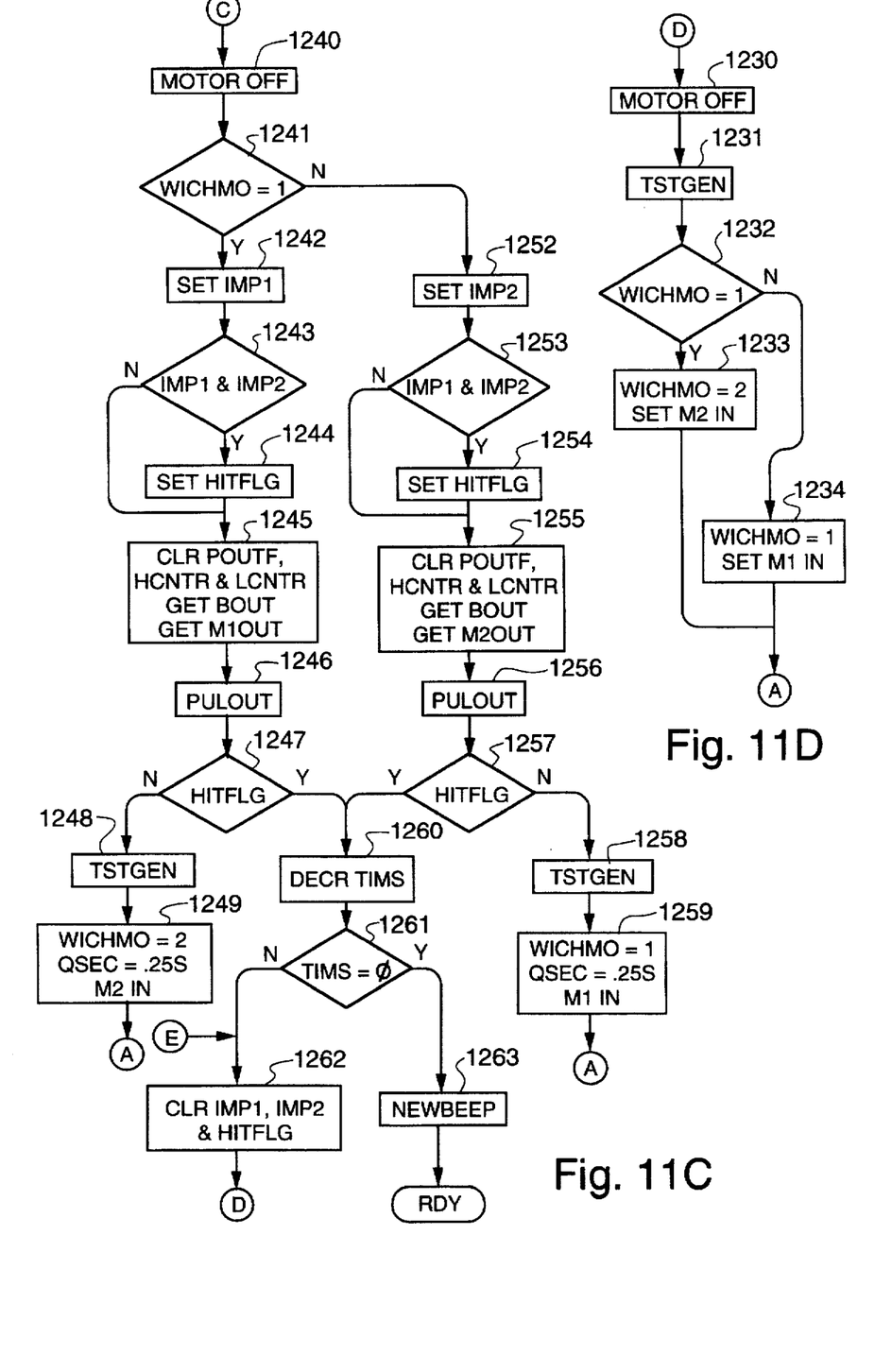

A jump is then made to the TSTGEN subroutine to check the operation of the knock sensor before beginning the movement of the other motor. Upon the return from TSTGEN the location WICHMO is tested to see if M1 or M2 was the motor whose movement was just completed. If WICHMO indicates M1, then at step 1233 it is set to indicate M2 and the code is obtained for controlling M2 to move the shearbar 102 inwardly toward the cutterhead 100. On the other hand, if the test at step 1232 should indicate that WICHMO is set to M2, then at step 1234 it is set to indicate M1 and a code is obtained for controlling M1 to move the shearbar 102 inwardly. After completion of step 1233 or 1234 the program branches back to step 2020 (FIG. 11A), where the status of the EOTOUT flag is checked for the motor M1 or M2, according to the code obtained at step 1233 or 1234. At step 1207 this code is sent to VIA 208 to energize either the Mosfet pair 290, 295 or 292, 297 and thereby activate motor M1 or M2 to move the end A or B of the shearbar 102 inwardly toward the cutterhead 100.

Depending on the position of the shearbar 102 at the time the adjusting procedure is initiated, M1 and M2 may be alternately energized one or more times as described above without driving either end A, B of the shearbar 102 into contact with the rotating cutterhead 100. Eventually however energization of one of the motors will result in contact. At step 1211 a RDSENS subroutine is executed to read the knock sensor output. This subroutine is described in further detail in European Patent Application EP-A-0.291.216, Col. 15, lines 1–18. Contact of the shearbar 102 with the cutterhead 100 generates a knock sensor output which is larger than NOI2. Therefore, when the knock sensor output is compared to NOI2 at step 1212 the program recognizes the hit and branches to step 1240 (FIG. 11C) where a code is sent to VIA 208 which deenergizes all Mosfets 290–297 thereby stopping all motors. At step 1241 WICHMO is checked to see which motor caused the hit. If it was M1 then the flag IMP1 is set at step 1242. IMP1 and IMP2 are checked at step 1243 to see if both have been set. If both IMP1 and IMP2 are set then HITFLG is set at 1244 before step 1245 is executed. If IMP1 and IMP2 are not both set then the program branches from step 1243 to 1245.

At step 1245 the flag POUTF is cleared, the code for moving M1 outwardly is fetched to the microprocessor A register and BOUT, the number of quarter-second intervals the motor is to be energized, is loaded into the microprocessor X register. BOUT may be on the order of 5 such intervals. A jump is then made to the PULOUT subroutine to energize M1 in a sense to move the shearbar 102 away from the cutterhead 100.

Upon return from the PULOUT subroutine HITFLG is tested. If it is not set, i.e. there has not been at least one impact by each of the motors, the program moves to step 1248 where the TSTGEN subroutine is executed to test the knock sensor. At step 1249 WICHMO is set to indicate M2, QSEC is reset to time a quarter-second interval, and the code is obtained for controlling the motor M2 to move the shearbar 102 inwardly. The program then branches back to step 2020 and proceeds to step 1207 where the motor is turned on by sending the code to the VIA 208.

Returning to step 1241, if the test shows that WICHMO is set to indicate M2 then the program branches to step 1252. Steps 1252–1259 correspond to steps 1242–1249 the only differences being that the flag IMP2 is set at step 1252, the code for energizing M2 is obtained at step 1255, and WICHMO is set to M1 and the code for energizing M1 is obtained at step 1259.

If a test at step 1247 or 1257 shows that HITFLG is set, the program then decrements TIMS at 1260 and tests it at 1261. If TIMS is not zero the program branches to 1262 to clear IMP1, IMP2 and HITFLG in preparation for checking for another set of impacts, one by each end A, B of the shearbar 102. It then proceeds to FIG. 11D where the state of WICHMO is changed and the code for next energizing one of the motors is obtained before branching back to step 1270 to energize the motor.

If the test at step 1261 proves true it means that the adjusting sequence is complete. A flag is set at step 1263 to beep the alarm 286, and the program then jumps to the READY routine.

It has been found that after two "hits", i.e. after impacts have twice caused HITFLG to be set, the shearbar 102 is spaced on the order of 0.1 mm to 0.25 mm from the cutterhead 100 and essentially parallel thereto. The gap between the shearbar 102 and the cutterhead 100 at the end of the adjusting procedure is governed in large part by the value of BOUT at step 1245 or 1255 which in turn controls the duration of motor energization during the PULOUT subroutines at steps 1247 and 1248.

If the test at step 1201 shows that the EOTIN flag is set, it means that one end A, B of the shearbar 102 has been moved to its limit of travel toward the cutterhead 100 and the corresponding motor has stalled. In this case the program sets flags to turn on one of the indicators 314 to indicate EOT and sound an alarm, and then jumps to the ALARM routine. In like manner, if the RPMOK flag is not set when the test is made at step 1225, the programs sets appropriate flags to turn on the RPM indicator and the alarm, and jumps to the ALARM routine.

At step 1202, the RPMOK flag is tested prior to any motor actuation. If the flag is not set the program sets flags for giving the alarm indication at step 1281 tests the QUIT flag to see if the operator has depressed the QUIT switch. If he has, the program jumps to the READY routine. If he has not, a Wait for interrupt is executed during the wait. The program then branches back to step 1202 to again check the RPMOK flag. If the cutterhead 100 is up to speed the program then clears the alarm flags at step 1203.

It will be recognized by those skilled in the art that by properly programming the VIA 208 so that some bus bit positions alternatively serve as input or output, it would be possible completely to dispense with the PIA 206. Thus, there is wide latitude in programming the control of the various indicators and alarms. For this reason the ALARM routine is not specifically described. The PIA 206 becomes necessary only when additional control features such as an automatic knife sharpener control are added into the system.

PULPOUT Routine

Figure 12:
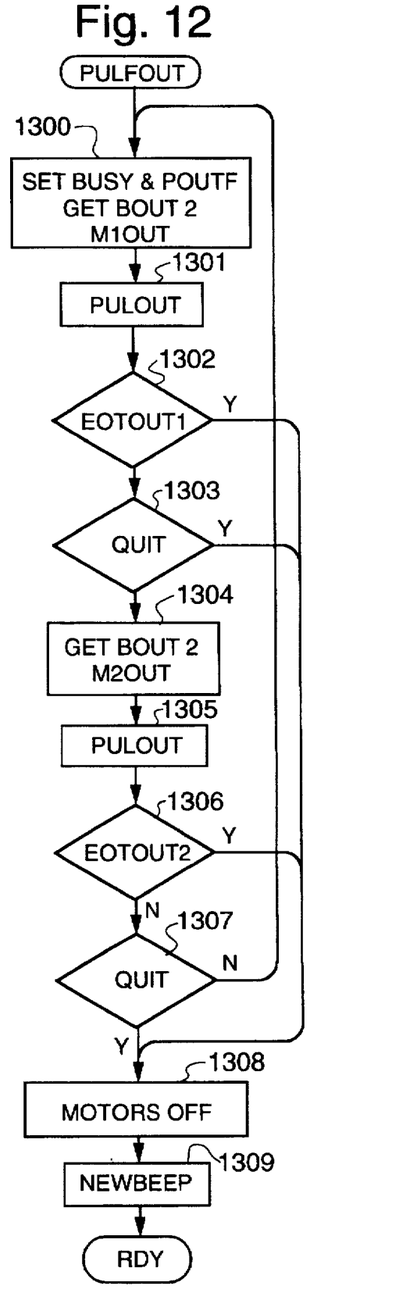
FIG. 12 shows the PULFOUT routine.

As previously indicated, the PULSW flag is set if the QUIT and ADJUST switches are actuated concurrently. By actuating both switches the operator may initiate the PULFOUT routine which moves each end A, B of the shearbar 102 to its limit of travel away from the cutterhead 100.

If the test at step 708 shows that PULSW is set the program jumps to the PULFOUT routine shown in FIG. 12. At step 1300 the BUSY and POUTF flags are set, the length of time for energizing the motor is loaded in the microprocessor X register, and the code for energizing M1 to move the shearbar 102 outwardly is entered in the A register. The program then jumps to the PULOUT subroutine to energize M1. Upon the return to PULFOUT EOTOUT1 is tested to see if end A of the shearbar 102 is at its limit of travel. If not, the QUIT flag is tested at 1303. Assuming the QUIT switch has not been actuated by the operator the microprocessor gets the control values for moving motor M2 outwardly (step 1304) and executes the PULOUT subroutine at step 1305 to move end B of the shearbar 102. Step 1306 tests EOTOUT2 to see if end B of the shearbar 102 is at its limit of travel and if it is not the QUIT flag is tested at step 1307.

If the QUIT switch is not depressed the program branches back to the beginning of the subroutine and continues executing the steps described above. When end A of the shearbar 102 reaches its outward limit of travel the test at 1302 proves true and the program branches to turn off the motor (step 1308) and set the flag for beeping the alarm (step 1309). The program then jumps to the READY routine. The program also branches to step 1308 if the test at step 1306 indicates that end B of the shearbar 102 is at its outward limit of travel.

The PULFOUT subroutine may be halted by depressing the QUIT switch alone. This sets the QUIT flag so that the program will branch from step 1303 or 1307 to step 1308, thus ending the pull-out operation.

Other embodiments of the present invention can be thought of, without departing from the original idea of the invention. For example, it is conceivable to eliminate the high/low current test during the full energizing of the motors in the RELEASE subroutine and to provide full current to the motors during a predetermined interval only.

It is also possible to limit the motor output during engagement of the fixed stop by comparing the actual current to a preset shut-off value and deenergizing the same when the current reaches or exceeds this value. During motor reversal for disengagement of the stop, a higher current and hence a higher motor power is allowed by setting no shut-off value or choosing a value, which is substantially larger than the value which was set for the stop engagement stage.

In summary, the present invention provides a completely automatic control for adjusting the position of a shearbar relative to a rotating cutterhead by alternately energizing first one and then the other motor to move first one end of the shearbar and then the other. Herein no limit switches are required for establishing the End Of Travel conditions of the shearbar ends.

Having thus described the invention, what is claimed is:

1. A method for moving a movable member (102) of an agricultural machine towards and away from a fixed stop (109) in said machine, said method comprising the steps of:

energizing a bidirectional motor means (110/112) for driving a screw means (106/108) to move said member (102) towards said fixed stop (109);

monitoring a variable indicative of the torque or force output of said motor means (110/112); and limiting said torque or force output to a first maximum value;

said method being characterized by the further steps of:

moving said member (102) against said fixed stop (109) and stalling said motor means (110/112) thereby;

deenergizing said motor means (110/112), when the resulting torque or force output reaches or exceeds said first maximum value; and energizing said motor means (110/112) for moving said member (102) in the opposite direction, away from said stop (109), while not limiting said torque or force output or while limiting the same to a second maximum value, which is substantially larger than said first maximum value, wherein said fixed stop is constituted by the border of an aperture through which an end portion of said movable member extends, and by a transverse member of the agricultural machine.

2. A method according to claim 1, characterized in that it comprises the further step of:

energizing said motor means (110/112) for moving said member (102) further away from said fixed stop (109), while limiting said torque or force output again to said first maximum value.

3. A method according to claim 2, characterized in that said torque or force output is limited automatically to said first maximum value after a predetermined time interval, during which said torque or force output was not limited or limited to said second maximum value.

4. A method according to claim 1, characterized in that said motor means comprises a bidirectional electrical motor (110/112) and said monitored variable is the electrical current consumed by said motor (110/112).

5. A method according to claim 4, characterized in that said torque or force output is limited to the first or second maximum value by providing a first or second amount of electrical power to said motor (110/112).

6. A method according to claim 5, characterized in that said second amount of power is provided by a continuous current from a current source and said first amount of power is provided by a hacked current from the same current source.

7. A method according to claim 6, characterized in that said current is hacked by a power transistor means (290-293), controlled by a microprocessor means (200), which equally monitors the current consumed by said motor (110/112).

8. A method according to claim 4, characterized in that said torque or force output is limited to said first or second maximum value by deenergizing said motor (110/112) when said monitored electrical current exceeds a first or second current value.

9. A method according to claim 1, characterized in that said agricultural machine is a forage harvester and said member is a movable shearbar (102) installed next to a rotatable cutterhead (100).

10. A method according to claim 9, characterized in that said fixed stop is constituted by the border of an aperture (109) through which an end portion of said shearbar (102) extends, and by a transverse member of the forage harvester which is substantially parallel to said shearbar (102).

* * * * *